(No Model.)
J. HOOD.
Hoe.
No. 237,867. Patented Feb. 15, 1881.
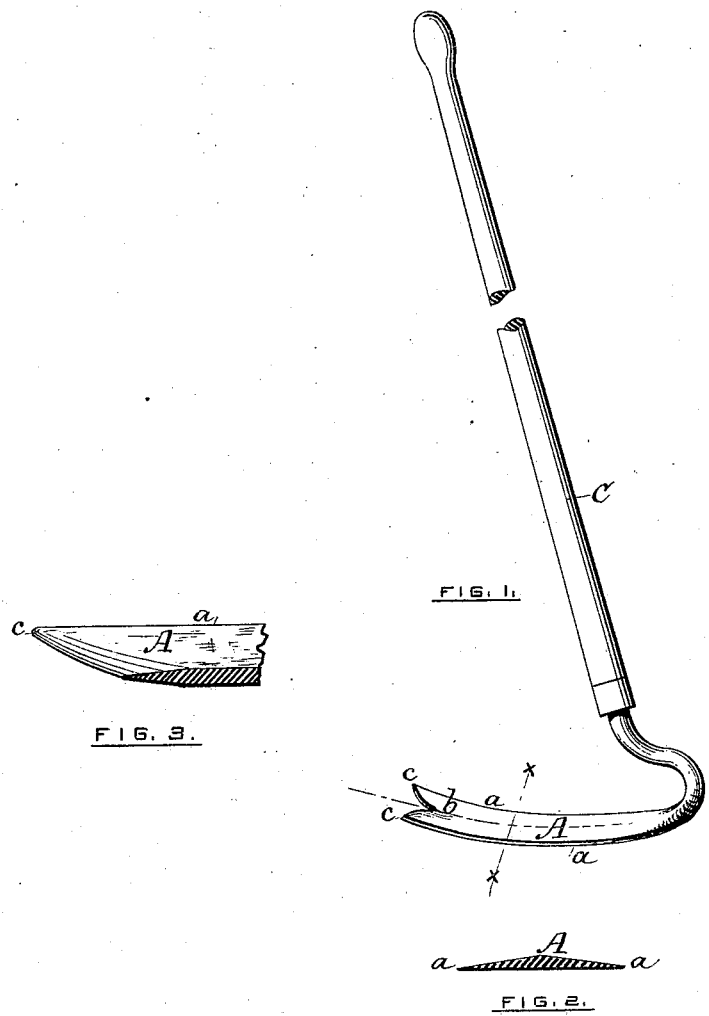
WITNESSES:
INVENTOR:
James Hood

UNITED STATES PATENT OFFICE.

JAMES HOOD, OF FRANKLIN, MASSACHUSETTS.

HOE.

SPECIFICATION forming part of Letters Patent No. 237,867, dated February 15, 1881.

Application filed August 28, 1880. (No model.)

*To all whom it may concern:*

Be it known that I, JAMES HOOD, of Franklin, in the county of Norfolk, in the State of Massachusetts, have invented a new and useful Improvement in Hoes, which invention is fully set forth in the following specification.

This invention relates to hoes for garden purposes, and has for its object to provide an implement of this kind which can be successfully used in the removal of weeds growing among plants and vegetables, and also in the removal of any redundant plants and vegetables, so as to avoid the necessity of stooping to remove them by hand, and which, while it answers all the purposes of an ordinary hoe, effectually stirs the ground and does not require the expenditure of a great amount of strength.

The improved implement or hoe, constructed in accordance with this invention, consists of one or more prongs or hooks having sharp edges, so as to answer the purposes of an ordinary hoe, and provided at the end with an angular indentation or notch, by means of which the implement can be used to grasp strong weeds and tear them up by the roots. This indentation or notch forms two points at the end of the prong or hook, which can be advantageously used for loosening and stirring the soil. The prong or hook of the improved hoe is preferably made to curve slightly upward so that when weeds are caught in the notched end to be uprooted the implement can be used as a lever, the curved under surface furnishing a bearing or fulcrum.

In order to give the implement greater strength than hoes as ordinarily constructed possess, the prong or hook is formed comparatively thick in the middle and diminishing in thickness toward the sides.

Referring to the accompanying drawings, which form a part of this specification, and which represent an implement or hoe constructed in accordance with the invention, Figure 1 is a perspective view of such an implement with a single prong; Fig. 2, a transverse section of the prong or hook on line *x x;* and Fig. 3, a section, partly in elevation, showing one of the points formed at the end of the prong or hook.

The prong or hook A, with its shaft B, can be made in any ordinary or suitable manner, and to it may be fitted a suitable handle, C. The edges *a* of the prong or hook A are made sharp, and can be used for scraping the soil and such like purposes, like an ordinary hoe. The end of prong A has an angular indentation or notch, *b*, in which weeds can be grasped and pulled up. The points *c*, formed by this indentation, can be advantageously used for loosening and stirring the soil. As best shown in Fig. 2, the prong or hook A is formed thick in the middle and diminishing in thickness toward the sides, so that its shape is triangular in cross-section. The prong or hook A is made, as shown, with an upward longitudinal curve, the object of this construction being to enable the implement to be used as a lever in uprooting weeds by grasping the latter in the notch *b* and using the under curved surface of the prong or hook as a fulcrum.

I am aware that hoes with serrated edges have been heretofore used, and that a single hook has also been employed for the purpose of stirring the soil and similar purposes to which an ordinary hoe is put; but these differ materially from the present invention, which comprises a hoe or implement made of one or more prongs or hooks with sharpened edges, and having an angular indentation or notch in the end of such prong or hook, by which construction an implement is produced capable of answering all the purposes of an ordinary hoe, and at the same time offering effective means for removing weeds and surplus vegetation, and for loosening and stirring the soil.

Although the implement may consist of two or more prongs or hooks, each with the notch or indentation described, it is deemed preferable to form it of a single prong or hook only, and this form is therefore shown in the drawings.

I claim—

A hoe having a prong or hook formed thick in the middle and diminishing toward the sides, as described, said prong or hook having in its extreme end an angular indentation or notch, substantially as and for the purposes set forth.

In testimony whereof I have signed this specification in the presence of two subscribing witnesses.

JAMES HOOD.

Witnesses:
HORACE F. HORTON,
HENRY F. BISHOP.